United States Patent [19]

Tonelli et al.

[11] Patent Number: 5,246,588

[45] Date of Patent: Sep. 21, 1993

[54] PROCESS FOR SEPARATING FROM ON ANOTHER THE NON-FUNCTIONAL, MONOFUNCTIONAL AND BIFUNCTIONAL SPECIES CONTAINED IN THE PERFLUOROPOLYOXYALKYLENES

[75] Inventors: Claudio Tonelli; Stefano Turri; Marinella Levi, all of Milan; Giuseppe Gianotti, Novara, all of Italy

[73] Assignee: Ausimont S.p.A., Milan, Italy

[21] Appl. No.: 963,658

[22] Filed: Oct. 20, 1992

[30] Foreign Application Priority Data

Oct. 21, 1991 [IT] Italy .............................. 002773A/91

[51] Int. Cl.$^5$ ............................................ B01D 15/08
[52] U.S. Cl. .................................... 210/656; 210/635; 570/262
[58] Field of Search ..................... 210/635, 656, 198.2, 210/502.1; 570/262

[56] References Cited

U.S. PATENT DOCUMENTS

| | | | |
|---|---|---|---|
| 3,544,537 | 12/1970 | Brace | 260/89.5 |
| 3,665,041 | 5/1972 | Sianesi et al. | 260/615 A |
| 3,766,251 | 10/1973 | Caporiccio et al. | 260/486 H |
| 3,810,874 | 5/1974 | Mitsch et al. | 260/75 H |
| 3,847,978 | 11/1974 | Sianesi et al. | 260/535 H |
| 4,647,413 | 3/1987 | Savu | 260/544 F |
| 4,814,372 | 3/1989 | Caporiccio et al. | 528/485 |

FOREIGN PATENT DOCUMENTS

| | | | |
|---|---|---|---|
| 0148482 | 7/1785 | European Pat. Off. | 210/198.2 |
| 0151877 | 8/1985 | European Pat. Off. | 210/198.2 |

Primary Examiner—Ernest G. Therkorn
Attorney, Agent, or Firm—Bryan Cave

[57] ABSTRACT

A process for separating, or enriching, non-functional, monofunctional and bifunctional species in a mixture of perfluoropolyoxyalkylenes of the general formula:

$$Z-O-Rf-Y$$

where
Rf = a perfluoropolyoxyalkylene chain comprising one or more monomeric units of formula

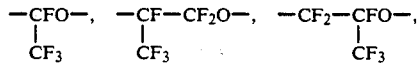

—CFXO— (X=F, CF$_3$), and optionally also units (—CF$_2$CF$_2$O—); and Z, Y, like or different from each other, are non-functional groups or functional groups containing —OH, which consists in subjecting said mixture of perfluoropolyoxyalkylenes to column chromatography using, as eluents, non-polar fluorinated solvents, either alone or in admixture with polar solvents.

8 Claims, No Drawings

PROCESS FOR SEPARATING FROM ON ANOTHER THE NON-FUNCTIONAL, MONOFUNCTIONAL AND BIFUNCTIONAL SPECIES CONTAINED IN THE PERFLUOROPOLYOXYALKYLENES

The present invention relates to a chromatographic method for separating in, or enriching with, non-functional, monofunctional and bifunctional species perfluoropolyoxyalkylenes consisting of or comprising macromolecules of general formula:

$$Z-O-Rf-Y \qquad (I)$$

where
Rf = a perfluoropolyoxyalkylene chain comprising one or more perfluoropolyoxyalkylene units of formula

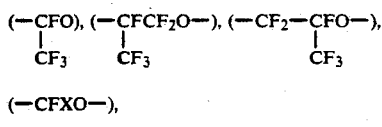

$(-CFXO-)$, and optionally also units of formula $(-CF_2CF_2O-)$, randomly arranged along such chain,
X = F, $CF_3$;
Z, F, like or different from each other, are groups $-CF_3$, $-CF_2CF_3$, $-CF_2CF_2CF_3$, $CF_2T$, $CFT_2$, or functional groups of formula $-CF_2CH_2O(CH_2CH_2O)_sH$, $-CF_2CF_2CH_2O(CH_2CH_2O)_sH$,
T = Cl, Br,
s = a number ranging from 0 to 2,
in which Z and/or Y, in a part of such macromolecules, are groups $-CF_2CH_2O(CH_2CH_2O)_sH$ and/or $-CF_2CF_2CH_2O(CH_2CH_2O)_sH$.

The average functionality of the perfluoropolyoxyalkylenes of formula (I) ranges from 0.8 to 1.2; generally it is of about 1.

In particular, the Rf chain can have one of the following structures:

$$(-C_3F_6O-)_q(C_2F_4O)_r-(CFXO-)_t \qquad (1)$$

$$(C_3F_6)_q(CFXO)_t \qquad (2)$$

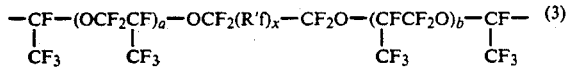

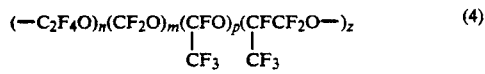

wherein:

$(-C_3F_6O-)$ can represent units of formula $(-CFCF_2O-)$,
$\phantom{xxxxxxxxxxxxxxxxxxxxxxxxxxxxxxxxxx}|$
$\phantom{xxxxxxxxxxxxxxxxxxxxxxxxxxxxxxxxxx}CF_3$ $(-CF_2CF-O-)$;
$\phantom{xxxx}|$
$\phantom{xxxx}CF_3$ a, b, m, n, q, r, t, z are positive numbers ranging from 0 to 100, the sum of which being such that Rf exhibits a (number) average molecular weight ranging from about 500 to about 10,000, but preferably from about 500 to about 4,000, with the molecular weight distribution preferably ranging from 1.5 to 2.5;

x = 0 or 1;
R'f = a perfluoroalkylene group containing from 1 to 4 carbon atoms.

Minor amounts of monomeric units of formula $(-CF_2CF_2CF_2CF_2O-)$ can be present also in chain Rf.

The perfluoropolyoxyalkylenes of formula (I), both the non-functional and the monofunctional and bifunctional, are known in the art. They can be prepared according to the methods described in U.S. Pat. Nos. 3,544,537, 3,766,251, 4,647,413 or in European patent application No. 151,877, or they can be obtained by photo-oxidation of $C_3F_6$ or of mixtures of $C_3F_6$ with $C_2F_4$, as is described for example in U.S. Pat. No. 3,665,041 or in European patent application No. 148,482, followed by conversion of end groups COF to groups $-OH$, in accordance with what is disclosed in U.S. Pat. Nos. 3,847,978 and 3,810,874, or in accordance with the process described in U.S. Pat. No. 4,814,372.

Generally, such perfluoropolyoxyalkylenes are available in the form of mixtures of macromolecules having an end group or both end groups consisting of the abovesaid functional groups with a certain amount of macromolecules having both end groups of the non-functional type.

Thanks to the presence of functional groups, said macromolecules are utilizable as macromonomer in several reactions, for example polycondensation reaction, besides as lubricants, surfactants and anticorrosive agents.

In particular it is known how it is important, in the graft reactions of hydroxylic monofunctional monomers on acrylic or methacrylic polymeric structures, to have available monomers exhibiting a high monofunctionality content.

In such reaction, the presence of monomers free from functional groups or containing polyfunctional groups jeopardizes the possibility of obtaining the corresponding polymers as it leads to undesired gellation and cross-linking phenomena, or it gives rise to plasticizing phenomena, thereby reducing the performances of the grafted polymers.

However, owing to the difficulty to separate from one another by conventional methods, for example by distillation, the various species of non-functional, monofunctional and bifunctional macromolecules, it is always necessary to use only mixtures of such species in the various reactions or applications.

It is a main object of the present invention to provide a process for preparing monofunctional perfluoropolyoxyalkylenes containing little amounts of bifunctional products.

By using such monofunctional perfluoropolyoxyalkylenes it is possible to obtain straight polymers by means of polycondensation reaction, which polymers contain pendants essentially deriving from chains of monofunctional perfluoropolyoxyalkylenes. The polymers so obtained are thermoplastic and exhibit characteristics which are typical of such polymers, such as e.g. solubility and moldability.

Generally speaking, the Applicant has found a process, which is the object of the present invention, for obtaining the separation from one another of two or more species of non-functional, monofunctional and bifunctional macromolecules, which the perfluoropolyoxyalkylenes of formula (I) are composed of, or for obtaining the enrichment of such perfluoropolyoxyalkylenes with at least one of the abovesaid species, by means of column chromatography carried out according to the modalities specified hereunder.

By column chromatography is meant herein the known method for obtaining the separation from one another of two or more components of a mixture, which consists in conveying substances contained in such mixture through a stationary phase by means of a moving phase. On this way, the individual substances are caused to slow down by the stationary phase as a function of the interactions which generate among mixture, moving phase and stationary phase. This slow-down is selective, and therefore, with a proper system of moving and stationary phases, the slow-down degree will be different for each component of the sample.

References to this method are contained in:
Snyder L. R.—"Principles of Adsorption Chromatography", 1968, MARCEL DEKKER
Cassidy H. G.—"Fundamentals of Chromatography" 1957, INTERSCIENCE PUBLISHERS.

The modalities employed by the Applicant in order to obtain via chromatography the separation of, and/or the enrichment with the various species composing the perfluoropolyoxyalkylenes of formula (I) are, in the order, the following:

a) preparing a stationary phase, by treatment of a solid phase, which is composed of a compound containing active sites and/or groups capable of forming bonds or interactions of the polar type, or hydrogen bonds, with the hydroxylic end groups of the perfluoropolyoxyalkylenes of formula (I), with a non-polar fluorinated solvent. Such a treatment consists in wetting or soaking the solid phase with said solvent, and it can be carried out on the solid phase when it is already in the chromatographic column, or separately, subsequently introducing the solid phase so treated into the column. Preferably, but not necessarily, a solvent volume twice the one of the chromatographic column is used for such treatment. Preferably, the stationary phase contains, as active sites or groups, free hydroxylic groups, which in the case of silica are represented by silanol groups; or it has the capability of generating positive electrostatic fields directed towards the outside of the solid phase surface, as in the case, for example, of alumina.

Examples of compounds which are preferred as stationary phase are silica gel, activated aluminas, magnesium oxide, Al and Mg silicates, such as e.g. Forisil ®. Preferably such compounds exhibit an average diameter of the pores below 200 Å;

b) adsorption of the perfluoropolyoxyalkylene by the stationary phase, carried out by feeding to the column head a perfluoropolyoxyalkylene solution in the minimum amount of the above-mentioned non-polar fluorinated solvent;

c) elution of the perfluoropolyoxyalkylene so adsorbed by feeding the above-mentioned non-polar solvent to the column head;

d) further subsequent elution of the perfluoropolyoxyalkylene by feeding to the column head a mixture composed of the above-mentioned non-polar solvent and of a polar solvent, with volume ratios of the former to the latter preferably ranging from about 9/1 to about 1/1;

e) washing the column containing the stationary phase with a pure non-polar solvent, and optionally f) recharging the stationary phase with a further perfluoropolyoxyalkylene sample to be subjected to chromatographic analysis according to the preceding steps (c) and (d).

Thus, it is an object of the present invention to provide a process for separating from one another one or more of the species of non-functional, monofunctional and bifunctional macromolecules, which constitute the perfluoropolyoxyalkylene of formula (I), or for enriching said perfluoropolyoxyalkylene oxyalkylene with one or more of the abovesaid species, which process consists in subjecting said perfluoropolyoxyalkylene to column chromatography under the above-cited conditions.

Non-polar fluorinated solvents suitable for being utilized in all the above-illustrated steps from (a) to (d) are all the fluorine-containing organic solvents endowed with an eluotropic strength $\epsilon > 0.05$ (referred to silica), capable of dissolving the perfluoropolyoxyalkylenes of formula (I) in an amount of at least 20 g per liter of solvent.

Delifrene 113 ® (1,1,2-trichloro-1,2,2-trifluoroethane) is preferably used as a non-polar solvent.

As polar solvents it is possible to utilize all the organic solvents, which are mixable with the above-mentioned non-polar solvents, are endowed also with acid or basic functions and have an eluotropic strength value, referred to silica, $\epsilon > 0.30$ and preferably $> 0.4$.

As polar solvents are utilizable, for example, alcohols, ketones, carboxylic acids, nitriles, amides, esters, alkylsulphoxides. As an example there are cited: methanol, ethanol, propanol, acetic acid, methyl or ethyl acetate, acetonitrile, dimethylformamide, acetone, methylethyl-ketone, dimethylsulphoxide.

As regards the stationary phase, the particle size is not a critical element for the process effectiveness. Generally, the particle size employed is the one which is typical of the products utilized in chromatography.

Among the various types of utilizable stationary phases, alumina, preferably but not necessarily neutral, in particular alumina 150 mesh, 58 Å, as well as silica gel 70–230 mesh, 60 Å and 100 Å, and silica gel 230–400 mesh, 60 Å have proved to be particularly effective.

By means of the above-described steps (a) to (d) it is possible to obtain the separation of the non-functional species from the monofunctional and bifunctional species which compose the sample. In particular, step (c) permits the separation of the non-functional species as a first head fraction, followed by the elution of a part of the polymer as monofunctional specie. Step (d) permits the conclusive separation of the mixture of monofunctional and bifunctional species originally present in the sample. In order to obtain also a substantial separation of the monofunctional species from the bifunctional species it was necessary to carry out, prior to the above-illustrated step (a), a further step, hereinafter referred to as (A), which consists in treating the stationary phase, before its utilization, with a mixture composed of a non-polar fluorinated solvent and of a polar solvent, as are described hereinbefore, such mixture having an eluotropic strength $\epsilon$ of at least 0.2 referred to silica. Such a treatment consists in suspending the solid phase in said solvent mixture and then in homogeneously filling the chromatographic column with the suspension so obtained.

Such treatment is preferably effected by introducing the solvent mixture into the column which already contains the stationary phase.

Preferably, but not necessarily, said operative step (A) is carried out by operating with volume ratios between solvent mixture and stationary phase in the range of from 3/1 to 5/1.

Before using the stationary phase in the separation process, it may be advisable to wash said stationary phase—especially if it has been directly purchased from the market—with an alcohol (methanol, ethanol, etc.) in order to remove impurities (surfactants, emulsifiers), which are always contained in the commercial products.

Such operation, although not always strictly necessary, can be effected in the chromatographic column or in any other vessel.

After said washing, the stationary phase is dried at temperatures usually ranging from 100° to 150° C.

As mentioned hereinbefore, in operative step (A) the ratio between polar solvent and non-polar solvent in the solvent mixture shall be such that the mixture exhibits an eluotropic strength $\epsilon$ equal to at least 0.2. Preferably, the $\epsilon$ value ranges from 0.3 to 0.6. For the determination of the $\epsilon$ values, the simplified method proposed by L. Snyder (op.cit., Appendix III) has been used.

Step (a), consisting in washing the stationary phase with a non-polar fluorinated solvent, has the purpose of wetting the stationary phase as well as of removing the polar solvent excess which is present in the column if step (a) has been preceded by step (A). The non-polar solvent amount used in such step is not critical; it can vary from 2 to 5 times the volume of the solvent mixture utilized for step (A)—if this step has been carried out—as a function of the column dimensions and of the ageing degree (due to preceding separation steps) of the stationary phase.

The combination of operative steps (A) and (c) is of the utmost importance for the success of the separation process if the purpose is that of obtaining an at least partial separation of the bifunctional species from all the other species. In such case, by means of step (c) it is possible to obtain a substantial elution of the perfluoropolyoxyalkylene fraction having lower functionality (non-functional and monofunctional species).

The non-functional, bifunctional and monofunctional species content in each eluted fraction varies as a function of the type of utilized polar solvent.

In the step for separating the bifunctional monomers, the fluorinated non-polar solvent/polar solvent volume ratio in the elution mixture, which preferably ranges from about 9/1 to 1/1, can very, however, over a wider range, as a function of the minimum $\epsilon$ value of the pure polar solvent.

In this operative step the utilized polar solvent and-/or non-polar solvent can also be different from the ones utilized in steps (A) and (a).

For profitability reasons, however, it is preferable that the solvents should be the same in the two steps.

In step (e) the stationary phase is restored by washing with a non-polar fluorinated solvent in order to make said phase ready for a new chromatographic separation operation with another polymer sample through steps (b) to (d).

In elution steps (c) and (d), the non-polar solvent and/or the mixture of non-polar solvent and polar solvent can be added into the chromatographic column in any volumes and batchwise.

By the process of the invention it is possible to carry out several successive separation cycles with unaltered separative effectiveness.

That renders the process of the invention very interesting for commercial-scale applications.

The process of the invention can be conducted at atmospheric pressure or at a higher pressure. If it is operated at a higher pressure than the atmospheric pressure, the results obtained are qualitatively similar to the ones obtained at atmospheric pressure with the advantage of a sensible reduction of the operative times.

It can be operated at room temperature or at a higher or lower temperature. Room temperature and temperatures below room temperature are preferred.

A few examples illustrating the object of the present invention are given hereinafter; such examples, however, are not to be considered as limitative.

The operative modalities utilized for practising the process of such examples, at atmospheric pressure or at a higher pressure, are the following:

a) Chromatography at atmospheric pressure

The fluorinated sample (about 10% by weight calculated on the stationary phase) is dissolved in the minimum amount of non-polar fluorinated solvent, charged and made to be adsorbed at the column head.

It is also possible to add the sample by firstly preparing a dispersion thereof in a little amount of the material which forms the stationary phase, and then by adding such dispersion to the stationary phase at the column head.

The sample is eluted with a non-polar fluorinated solvent (for example 1000–2000 ml/10 g of polymer), thereby obtaining a head fraction composed of a non-functional polymer or of a polymer having a low content of functional species.

By collecting the first fractions, corresponding to 300–500 ml of eluted non-polar solvent, it is possible to observe an extremely low non-functional species content, not exceeding 20%. Going on eluting with a non-polar solvent, the monofunctional polymer peak is developed, while the last 5%–10% of the sample, which is characterized by a bifunctional species amount equal to about 50%, is eluted by adding methanol or another polar organic solvent mixed with the non-polar fluorinated solvent. If the chromatographic process is preceded by step (A), the elution volumes are generally reduced, and by elution with the non-polar fluorinated solvent, a polymer having an average functionality $<1$ and virtually free from bifunctional molecules is obtained.

b) Chromatography under pressure

It is possible to operated with overpressures ranging from 1 atmosphere to a few tens atmospheres, depending on the utilized apparatus and on its dimensions.

The tests herein illustrated were carried out using a glass column having an outside diameter of 45 mm (inside diameter of 40 mm) and a length of 700 mm, with an overpressure of about 1 atmosphere. As a stationary phase, a particular silica gel with low particle size (230–400 mesh, 60 Å), subjected to operative step (A), was utilized.

Tests have proved that this type of stationary phase offers the maximum efficiency and resolution when the applicated pressure permits an eluted product outflow rate of about 5/minutes. Under these conditions, the fluorinated sample composed of the same perfluoropolyoxyalkylene utilized under the preceding point (a) (charged in an amount of 35% by weight referred to silica) is made to be adsorbed and eluted under pressure according to modalities quite similar to the ones indicated for the atmospheric pressure chromatography.

EXAMPLE 1

Into a glass column having an inside diameter equal to 40 mm there were charged 100 g of silica gel (230-400 mesh, 60 Å), which had been previously washed with methanol and dried in oven at 130° for 12 hours.

The stationary phase was homogeneously packed by treatment in column with a mixture (500 ml) of Delifrene 113/methanol in a volume ratio of 9/1, then it was washed with 1,500 ml of Delifrene 113.

10 g of perfluoropolyoxyalkylene of formula (I), in which Rf had structure (1), average molecular weight=650 and (average) functionality=1.02, dissolved in Delifrene 113, were caused to be adsorbed at the column head and were then eluted with 3 l of Delifrene and subsequently with a mixture of Delifrene and methanol in a 9/1 volume ratio.

At successive intervals, the following fractions (in which the functionality is expressed by average values) were collected:

BS1: 32.5% by weight; Mn=780; Functionality=0.89
BS2: 38.7% by weight; Mn=615; Functionality=1.01
BS3: 21.2% by weight; Mn=620; Functionality=1.08
BS4: 7.5% by weight; Mn=600; Functionality=n.d.

EXAMPLE 2

It was operated under the preceding conditions, except that the stationary phase was packed utilizing only Delifrene (instead of the Delifrene/methanol 9/1 mixture).

In such a case, the separation effectiveness between neutral species and monofunctional species was increased.

10 g of a perfluoropolyoxyalkylene similar to the one utilized in the preceding example were then made to be adsorbed, whereafter it was eluted with Delifrene and then with a 9/1 mixture of Delifrene/methanol for total 3 liters.

The following fractions were obtained:
BZ1: 12.0% by weight; Mn=1010; Functionality=0.54
BZ2: 88.0% by weight; Mn=620; Functionality=1.08.

EXAMPLE 3

The BS1 fraction obtained in example 1 was subjected again to chromatographic analysis under the conditions indicated in example 2; the following two fractions were so obtained:
BS11: 31% by weight; Mn=880; Functionality=0.60
BS12: 69% by weight; Mn=735; Functionality=1.00.

EXAMPLE 4

Into a glass column having a diameter of 70 mm there were charged 250 g of silica gel (230-400 mesh), which had been previously washed with methanol and dried in oven at 130° C. for 12 hours.

Operating under the conditions of example 2, a sample of 12 g of a perfluoropolyoxyalkylene of formula (I), in which Rf had structure (1), with s=0, average molecular weight=650, functionality=1.05, was introduced into the column.

By eluting with Delifrene (3.5 liters), the following fractions were collected:
$X_1$=9.8% by weight; Mn=1300; Functionality=0.06
$X_2$=43.5% by weight; Mn=640; Functionality=1.01
$X_3$=33.9% by weight; Mn=602; Functionality=1.10.

Then it was eluted with 0.5 l of a Delifrene/methanol mixture=9/1 by volume, thereby obtaining the $X_4$ fraction, characterized as follows:
$X_4$=10.6% by weight; Mn=700; functionality=1.71.

EXAMPLE 5

It was operated as in example 4, except that the stationary phase was firstly packed with a Delifrene/methanol mixture=9/1 by volume, using a perfluoropolyoxyalkylene of formula (I), with s=0, functionality=1.02, wherein Rf had structure (1) and an average molecular weight=700, and eluting with Delifrene as such.

The following fractions were obtained, each after elution with 0.5 l of Delifrene:
$Y_1$=9.30% by weight; Mn=1100; Functionality=0.24
$Y_2$=24.90% by weight; Mn=660; Functionality=1.00
$Y_3$=16.61% by weight; Mn=640; Functionality=1.06
$Y_4$=25.06% by weight; Mn=650; Functionality=1.10
$Y_5$=9.14% by weight; Mn=660; Functionality=1.19

It was then eluted with 0.5 l of a Delifrene/methanol mixture 9/1 by volume, so obtaining the $Y_6$ fraction characterized as follows:
$Y_6$=14.97% by weight; Mn=670; Functionality=1.38.

We claim:

1. A chromatographic process for separating non-functional, monofunctional, and bifunctional species from a mixture of perfluoropolyoxyalkylenes of the general formula:

Z—O—Rf—Y or for enriching the mixture in at least one of said species wherein

Rf=a perfluoropolyoxyalkylene chain comprising one or more perfluoropolyoxyalkylene units of formula $$(-CFO-), (-CFCF_2O-), (-CF_2-CFO-), \text{ and } (-CFXO-),$$
$$\phantom{(-}CF_3 \phantom{xx} CF_3 \phantom{xxxxx} CF_3$$

statistically arranged along such chain;
X=F, $CF_3$;
Z, Y, like or different from each other, are groups —$CF_3$, —$CF_2CF_3$, —$CF_2CF_2CF_3$, $CFT_2$, or functional groups of formula —$CF_2CH_2O(CH_2CH_2O)_sH$, —$CF_2CF_2CH_2O(CH_2CH_2O)_sH$,
T=Cl, Br, and
s=a number ranging from 0 to 2, said process comprising subjecting the mixture of perfluoropolyoxyalkylenes to column chromatography according to the following steps:

(a) preparing a stationary phase by treating a solid phase, containing active sites and/or groups capable of forming bonds or interactions of the polar type, or hydrogen bonds, with the hydroxylic end groups of the perfluoropolyoxyalkylenes, with a non-polar fluorinated solvent;

(b) adsorption of the perfluoropolyoxyalkylene by the stationary phase, carried out by feeding to the column head a perfluoropolyoxalkylene solution in a minimum amount of the above-mentioned non-polar fluorinated solvent;

(c) elution of the perfluoropolyoxyalkylene so adsorbed by feeding the above-mentioned non-polar solvent to the column head;

(d) further subsequent elution of the perfluoropolyoxyalkylene by feeding to the column head a mixture composed of the above-mentioned non-polar solvent and of a polar solvent, with volume ratios of the former to the latter ranging from about 9/1 to about 1/1; and (e) washing the column containing the stationary phase with a pure non-polar solvent.

2. The process of claim 1, wherein operative step (a) is preceded by a treatment (A) of the stationary phase, with a mixture of a non-polar fluorinated solvent and of a polar solvent, which mixture has an eluotropic strength of at least 0.2 relative to silica.

3. The process of claim 2, wherein the eluotropic strength of said mixture ranges from 0.3 to 0.6.

4. The process of claim 1, wherein the polar solvent has an eluotropic strength higher than 0.3 relative to silica.

5. The process of claim 1, wherein the non-polar fluorinated solvent consists of 1,1,2-trichloro-1,2,2-trifluoroethane.

6. The process of claim 1, wherein the solid product which forms the stationary phase has an average diameter of the pores below 200 Å.

7. The process of claim 1 wherein Rf additionally includes units of the formula ($-CF_2CF_2O-$).

8. The process of claim 1, wherein after the column is washed in step (E), the stationary phase is recharged with a further perfluoropolyoxyalkylene sample which is subjected to the chromatographic treatment of steps (C) and (D).

* * * * *